Dec. 25, 1962   A. C. MUELLER   3,069,869
PORTABLE BEVERAGE COOLER AND DISPENSER
Filed April 3, 1961
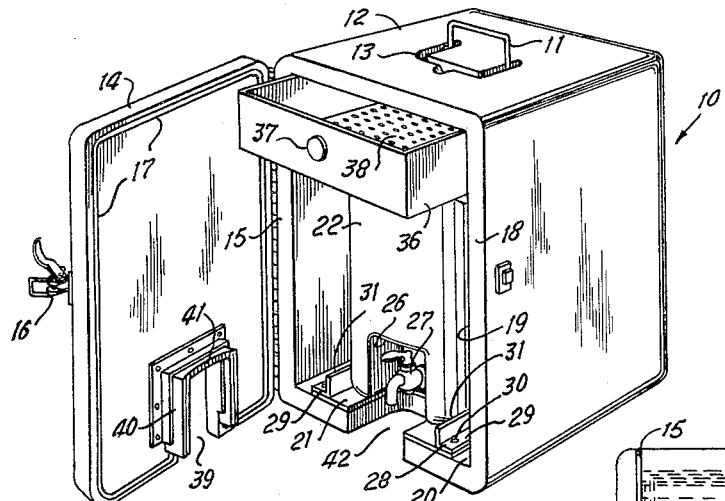
Fig. 1
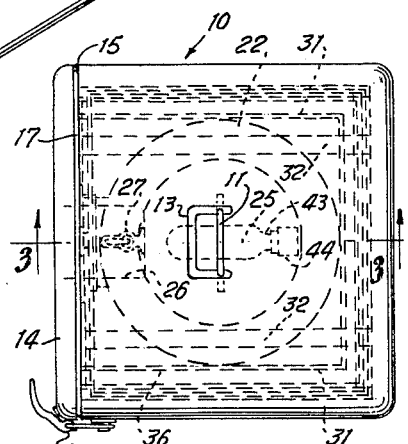
Fig. 2
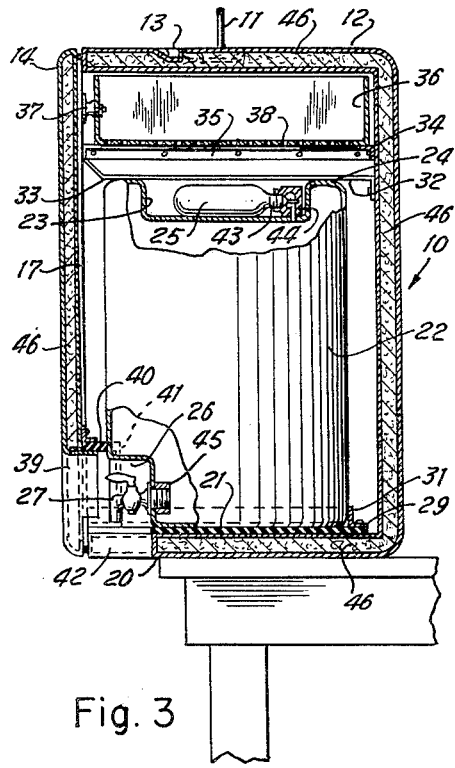
Fig. 3
Fig. 4
INVENTOR
Aubrey C. Mueller
BY   *Cecil C. Wood*
ATTORNEY United States Patent Office 3,069,869
Patented Dec. 25, 1962

3,069,869
PORTABLE BEVERAGE COOLER AND DISPENSER
Aubrey C. Mueller, 7030 Whitehill, Dallas, Tex.
Filed Apr. 3, 1961, Ser. No. 100,442
4 Claims. (Cl. 62—371)

This invention relates to beverage cooling devices, and it has particular reference to a portable cooling cabinet adapted to removably receive a dispensing container for beverages, especially of the carbonated type, such as beer, and the like, and it has for its principal object the provision of an insulated housing having a hinged closure on one of its sides and a compartment in its lower portion for a tank or cask containing a carbonated beverage, and means in close proximity thereto for containing a refrigerant capable of maintaining the cask and its contents at relatively low temperatures for indefinite periods.

An object of the invention is that of providing a beverage container which can be easily transported and made ready for use with a minimum of effort and affording a container from which the contents can be dispensed, as desired, without removing the same from its cabinet.

Another object of the invention resides in the provision of a container having a conformation adapting the same to be compactly stored in the cabinet, and capable of being interchanged with like containers so that, when emptied, it can be quickly replaced by a filled container, resulting in the saving of time and effort.

A still further object of the invention is that of providing a container in which is embodied means for detachably connecting thereto a carbon dioxide gas bottle whereby gaseous carbon dioxide is admitted to the container to expel the contents through a dispensing valve or spigot therein.

Yet another object of the invention is that of providing a removable receptacle for containing a refrigerant, such as "Dry Ice," or solidified carbon dioxide, and by which the refrigerant can readily be replenished as desired.

Broadly, the invention contemplates the provision of a relatively light and compact portable unit for containing beverages under refrigeration for relatively long periods of time, and providing means for dispensing the contents without opening the cabinet.

While the foregoing objects are paramount, other and lesser objects will become manifest as the description proceeds, taken in connection with the appended drawings wherein:

FIGURE 1 is a perspective illustration of the invention showing the front closure in open position, and illustrating the removable beverage container and the refrigerant receptacle.

FIGURE 2 is a top plan view of the invention, the insulation, beverage container and refrigerant receptacle being shown in dotted lines.

FIGURE 3 is a vertical sectional view of the cabinet, on lines 3—3 of FIGURE 2, showing the container and broken away portions therein showing the $CO_2$ bottle and dispensing valve.

FIGURE 4 is a perspective illustration of a beverage container adapted for installation in the cabinet in the manner shown in FIGURES 1 and 3.

The device embodying the invention is especially suitable for use in such outdoor activities as hunting, fishing, camping, and the like, affording the advantage of dispensing cooled beverages without the use of bottles, cans, or other devices, while also providing for carbonation of the beverage in bulk.

In the preferred embodiment of the invention the cabinet 10 is rectangular in form, substantially square in transverse section and having a greater height than width, although the structure may be round in transverse section if desired. A suitable handle 11 is arranged in the top 12 of the cabinet 10 for transporting the device and it is preferable that the handle 11 be foldable into a conforming recess 13, as shown in FIGURES 1, 2 and 3.

The cabinet 10 has a hinged closure 14 supported on a piano type hinge 15, as shown in FIGURE 1, and is provided with a suitable latch 16 by which the closure 14 can be tightly drawn in against a sealing element 17 arranged about the inner surface of the closure 14 and which engages the perimetrical surface 18 about the opening 19 of the cabinet 10, in the manner shown in FIGURES 2 and 3, and thoroughly seal the same.

In the bottom 20 of the cabinet 10 is arranged a pad 21, of suitable plastic material, to provide a supporting surface for a beverage container 22, shown in perspective in FIGURE 4, and which is formed with a recess 23 in its head 24 defining a compartment for a carbon dioxide gas bottle 25. A recess 26 is formed in one side of the container 22, near the bottom thereof, housing a dispensing tap 27.

Around the perimeter of the pad 21 in the bottom 20 of the cabinet 10 is arranged a frame 28 of angular members whose horizontal flanges 29 are secured by screws 30, or other device, to the bottom 20 through the pad 21, the vertical flanges 31 serving to embrace the bottom portion of the container 22 and center it within the cabinet 10, as indicated in FIGURES 1, 2 and 3. The frame 28 also functions to guide the container 22 into the cabinet 10 and firmly secure the same against lateral movement when the cabinet 10 is being transported.

The container 22 is restricted against vertical movement in the cabinet 10 by a pair of shoes 32 spaced from the top 12 thereof, and from either side, as shown in FIGURE 3, and in dotted lines in FIGURE 2. The shoes 32 are formed of angular members which have their horizontal flanges 33 turned upwardly at an obtuse angle at their forward ends, as shown in FIGURE 3, to engage the top of the container 22 as the latter is inserted into the cabinet 10 and guide it to its proper position. It will be observed that the container 22 is fitted into the cabinet 10 in such manner as to afford little or no lateral or vertical movement therein.

Above the shoes 32, and attached to each of the inner surfaces of the side and back walls of the cabinet 10, and across the front thereof, is a rectangular frame 34, the opposing side members 35 thereof providing slides for a drawer 36 which reposes in the upper portion of the cabinet 10, in the manner shown in FIGURES 1 and 3. The drawer 36 is adapted to contain solidified carbon dioxide, or Dry Ice, for refrigerating the cabinet 10. A suitable knob or handle 37 is provided on the front panel of the drawer 36 for removing and installing the same. The drawer 36 has a foraminous bottom 38 to facilitate circulation therethrough, as shown in FIGURES 1 and 3.

The closure 14 has an opening 39 formed centrally of its lower edge, as shown in FIGURES 1 and 3, about which is provided a flange 40 whose inner edge engages the container 22 about the recess 26 therein and excludes outside atmosphere from the cabinet 10. The flange 40 has a radius, as indicated at 41, which conforms to the contour of the container 22, when the closure 14 is closed, to completely seal the opening 39 except a substantially rectangular recess 42 in the front of the bottom 20 of the cabinet 10 through which the contents of the container 22 can be dispensed from the tap 27 which is accessible through the opening 39 in the closure 14, as shown in FIGURE 3, when the cabinet 10 is sealed.

The interchangeable bottle 25 has a neck portion 43 which can be threaded into a fitting 44 in the recess 26 and communicating with the interior of the container 22, as shown in FIGURES 3 and 4. The tap 27 is threaded into a suitably threaded port 45 in the recess 26 of the container 22, as shown in FIGURE 3. The container 22 may be filled through the port 45.

The cabinet 10 and the container 22, as well as the tap 27, may advantageously be formed of plastic, if desired, or other non-corrosive and rust resistant materials. Any suitable insulation materials 46 may be employed in the walls and closure of the cabinet 10.

The invention is obviously capable of certain changes and modifications in design and structure without departing from the spirit and intent of the invention or the scope of the appended claims.

What is claimed is:

1. In a portable cooler for carbon dioxide charged beverages in a container having a recessed dispensing tap in one side and near the bottom thereof, in combination with said container, an insulated cabinet having an opening on one side and a hinged closure for said opening, the said closure having an opening in its lower edge registered with said recessed tap in said container when said closure is closed, means comprising an internal flange surrounding said opening in said closure embracing said recessed tap and isolating the same from the interior of said cabinet when said closure is closed, means in said cabinet for charging said container with a carbonated gas, and a receptacle slidably arranged in the upper portion of said cabinet for a refrigerant.

2. In a portable cooler for carbonated beverages in a cylindrical container having a recessed top and a fitting in said top communicating with the interior of said container, and a carbonated gas bottle in said recessed top and connected to said fitting, the said container having a recess formed near the bottom thereof and a dispensing tap connected into said container in said recess, in combination with said container, an insulated cabinet therefor and a hinged closure for said cabinet, an opening in the lower portion of said closure adapted to register with the said recess in said container and said tap therein when said closure is closed, a sealing flange arranged about said opening in said closure and extending inwardly therefrom engageable with said container about said recess and said tap and isolating the latter from the interior of said cabinet whereby said tap is accessible through said opening when said closure is closed, and a receptacle slidably arranged in the upper portion of said cabinet for a refrigerant.

3. In a portable cooler for carbonated beverages in a cylindrical container having a source of carbonated gas connected thereto and recessed in the top of said container, and a dispensing tap connected in said container and recessed in a side thereof, in combination, an insulated cabinet for said container and a hinged closure for said cabinet having an opening in the lower portion thereof providing access to said tap when said closure is closed, means surrounding said opening in said closure sealing off said tap from the interior of said cabinet in the closed position of said closure, and a receptacle slidably arranged in the upper portion of said cabinet for a refrigerant.

4. In a portable beverage cooler as described in claim 3 wherein the bottom of said cabinet is recessed inwardly defining an opening therein aligned with said opening in said closure below said tap when said closure is closed.

References Cited in the file of this patent

UNITED STATES PATENTS

| 1,987,323 | Carroll | Jan. 8, 1935 |
| 2,039,704 | Clarke | May 5, 1936 |
| 2,558,181 | Kassel | June 26, 1951 |
| 2,749,096 | Cole | June 5, 1956 |